United States Patent [19]
Kikinis

[11] Patent Number: 5,875,436
[45] Date of Patent: Feb. 23, 1999

[54] VIRTUAL TRANSCRIPTION SYSTEM

[75] Inventor: Dan Kikinis, Saratoga, Calif.

[73] Assignee: Data Link Systems, Inc., San Jose, Calif.

[21] Appl. No.: 699,717

[22] Filed: Aug. 27, 1996

[51] Int. Cl.[6] .................................................. B42D 15/00
[52] U.S. Cl. ................ 705/34; 395/200.33; 395/200.47; 395/200.57; 369/24; 369/25; 369/29
[58] Field of Search ........................ 395/200.33, 200.47, 395/200.48, 200.49, 200.57; 369/24, 25, 29, 34; 705/34

[56] References Cited

U.S. PATENT DOCUMENTS 5,146,439  9/1992  Jachmann et al. ........................ 369/25

*Primary Examiner*—Thomas Peeso
*Attorney, Agent, or Firm*—Donald R. Boys

[57] ABSTRACT

A computerized transcription system is based on a transcribe server that receives voice messages over long distance links, assigns jobs to technicians at remote locations, sends voice files to and receives transcribed work from the technicians, forwards transcribed copies to instructed and preprogrammed destinations, informs subscribers of completion, and calculates and forwards accounting to subscribers. In extended aspects the system comprises multiple such servers networked together. Technicians at remote locations are paged in a preferred embodiment, and have an option to accept or decline a job. Upon acceptance the work is transmitted. Upon completion technicians return transcribed versions of jobs to the transcribe server, where forwarding is accomplished based on preprogrammed and attached instructions.

10 Claims, 2 Drawing Sheets

```
200     Main
201         GetDoc
202         FindTec
203         MailDoc
204         BillCust
205     end
206
207     Proc GetDoc
208         When Call
209             get Customer ID
210             get Customer PIN
211             get optional preprogrammed destination
212             n=1
213             until end of call
214                 RedcordDictation(n) until finshed; n=n+1; put in DocList
215             end call
216     End GetDoc
217
218     Proc FindTec
219         When DocList <> empty
220             While no technician selected
221                 SendPage for next active technician with job ID
222                 If no response within 5 minutes
                        Then remove this technician from list
223                 If Response then select this technician for job
224             Mail voice file and instructions to technician for processing
225             Remove from DocList to PendMail
226     End FindTec
227
228     Proc MailDoc
229         If TranscribedDox <> empty then
229             If Fax# then Fax doc
230             If e-mail then mail doc
231             If StreetAdress then Print Doc;
                    Print Label;
                    FEDEX | UPS | USPS doc
232         Remove Job ID from PendMail and TranscribedDox to BillDox
233     End MailDoc
234
235     Proc BillCust
236         If BillDox<> empty then
237             Get CustProfile
238             Calculate cost(Jobsize, Priority, MailMethod, MailCost)
239             Bill Customer with job-ID
240             Remove Job from BillDox to LongTermArchive
241     End BillCust
```

*Fig. 2*

VIRTUAL TRANSCRIPTION SYSTEM

FIELD OF THE INVENTION

The present invention is in the area of Internet Services, and pertains more particularly to a system for providing dictation and transcription services over the Internet.

BACKGROUND OF THE INVENTION

The kinetics of business involves evolution of ideas into documents of many sorts. Ideas originate in the human mind, but for ideas to be developed and broadly communicated, transcription to at least printed form must be accomplished. With the development of computer systems, this process of transcription has become one of first creating a digital document, which can then be manipulated in many ways, communicated around the world, and quickly printed in many forms. People who work with ideas and documents today have access to tools unprecedented even twenty years before this patent application, mostly computer-based. People in a business setting, and even at home with the rapid development of personal computers, have at their fingertips word processing applications, powerful graphics programs, scanners and optical character recognition, modems, satellite links, and more. Computers that execute these powerful applications are commonly linked over wide area networks and the world-wide network over the telephone system known as the Internet.

Unfortunately, when people travel, the tools they have at home and in the office are not always available. There are, of course, portable computers and recorders, and even small portable scanners, but the convenience of having fellow workers, research people, and clerical aid is not generally available. This difficulty manifests itself importantly at the first instance of creativity, that of getting ideas in communicable form. Away from the office and home, in a motel room, a plane or a train, transcribing ideas may be a challenge.

In this circumstance a person has at least access to a recording device, and may record their ideas for later transcription to digital, machine-readable form, and into printed matter. There are both tape-based and electronic memory devices. Tape-bases devices can record many minutes of monologue, but are typically bulky, and can be prone to poor quality recording. Digital electronic recording systems have limited capacity and can typically record only at most a few minutes, and are thus useful only as message machines.

Another difficulty with recorders of all types is that they are apparatus that must be carried along when traveling, and if misplaced or lost, all the contents are lost as well.

Regardless of the type of recording device a person might carry and use, it is necessary after recording ideas to carry the recorder to a person to play back the recording and transcribe the text. What is needed is a system that allows a person away from typical office equipment to have ideas communicated and transcribed without having to physically carry and operate a recording apparatus and deliver recording media to others for transcription.

SUMMARY OF THE INVENTION

In a preferred embodiment a transcription system is provided comprising a first long-distance communication link for a subscriber to transmit substantially voice-based information to be transcribed; a transcribe server connected to the first communication link for receiving and processing the information to be transcribed; a second communication link connected to the transcribe server for alerting and involving a transcribe technician; a third communication link adapted for data communication between the transcribe server and a computer used by the transcribe technician; a fourth communication link connected to the transcribe server for informing the subscriber that the job has been accomplished; and forwarding links for forwarding copies of finished transcription to selected destinations. The transcribe server receives the substantially voice-based information over the first link, alerts a transcribe technician over the second link, sends the substantially voice-based information to the transcribe technician over the third link, receives a transcribed version of the substantially voice-based information from the transcribe technician over the third link, informs the subscriber of progress over the fourth link, forwards copies of the transcribed version to selected forwarding stations over the forwarding links, and calculates and transmits billing to the subscriber.

In some systems multiple servers are incorporated and networked. The first link may be a telephone-based voice link, and messages sent by voice to be transcribed are typically sent with codes for identifying preprogrammed processing and forwarding instructions. Aging links are typically used in most embodiments for alerting technicians and for informing subscribers of completion. Forwarding links for transcribed copies include e-mail links, facsimile links, surface mail, and package services.

The transcribe server in a preferred embodiment comprise a recording and listing module adapted for receiving from subscribers and recording voice-based messages including instructions for processing and forwarding copies of transcribed versions; an alert module adapted for enlisting transcribe technicians, forwarding the voice-based messages including processing instructions to the transcribe technicians, and for receiving and storing transcribed versions of the voice-based messages returned by the transcribe technicians; a forwarding module adapted for forwarding the transcribed versions to preselected destinations; and an accounting module adapted for calculating billing and forwarding billing information to the subscribers. Specific processing and forwarding instructions are preprogrammed for specific subscribers.

The system of the present invention provides a quick and efficient service for subscribers that is also inexpensive, and allows subscribers to avail themselves of full office services while traveling, while at the same time being unencumbered by equipment.

BRIEF DESCRIPTION OF THE DRAWING FIGURES

FIG. 2 is a pseudo code listing for operational software for the system of FIG. 1.

DESCRIPTION OF THE PREFERRED EMBODIMENTS

Figure 1:
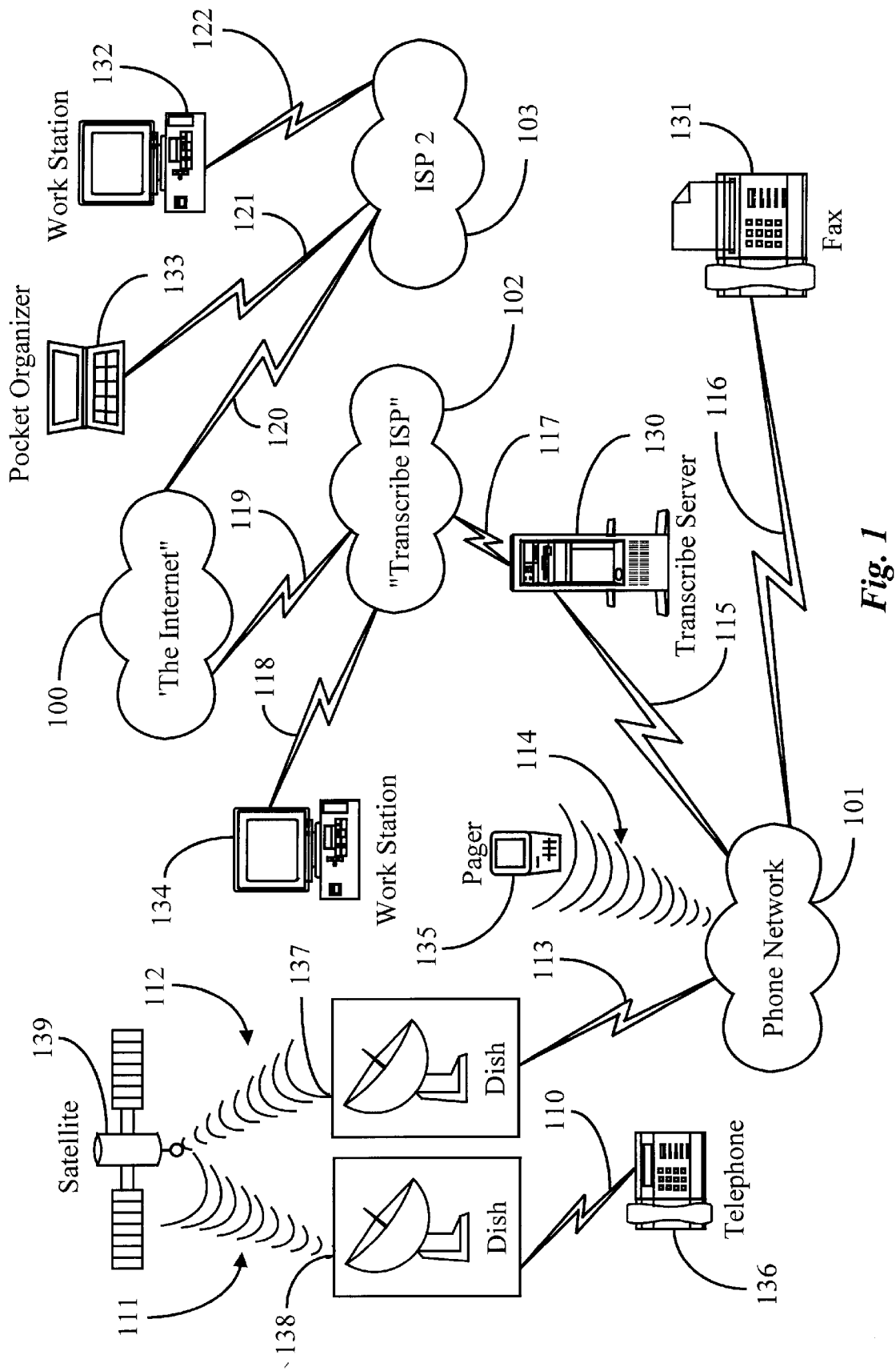
FIG. 1 is a topology diagram of a system according to a preferred embodiment of the present invention.

In a preferred embodiment, a system is provided wherein a person may dial up a server and dictate information to be transcribed into a voicemail type of recording device. Before being able to record, a subscriber is required to input information such as an account number, a password, and so forth. At the end of dictation, instructions need to be provided as to the processing of the dictated material. For example, a subscriber might instruct that the dictated information be formatted as a word processor document and then e-mailed to a certain e-mail address. The same subscriber might further instruct that another copy be faxed to a hotel where the subscriber is staying (or will be staying shortly), in which case the name and phone number of the hotel would typically be included in the instructions.

In this example, once a dictation including instructions is finished, it is e-mailed to a transcription center. Since the dictated material is already an electronic message containing a digital recording of the subscriber's voice, the center would page for the next available transcription person, which then can call in or pick up the e-mailed information if that person elects to accept the task. If not accepted, the system pages the next available person until the job is accepted.

Once the mail is picked up, the operator accepting the task plays the voice recording with a special player, transcribes it according to the instruction on the recording, and follows the forwarding instructions at the end of the recording. Forwarding may mean e-mailing, faxing, mailing by Federal Express, or any combination of many forwarding possibilities.

When the material is transcribed and forwarding instructions begin to be followed, a page is initiated alerting the original subscriber who initiated the process that the task is nearing completion, or is completed. By having this electronic transportation of the recording via a Wide-Area Network the transcription service can be done very decentralized or very de-localized. By decentralized is meant that a large number of operators may be employed, who need not be tied to a particular location and may work at home or from small offices in widely separated areas where costs may be lower than in more urban surroundings. By de-localized is meant call centers or multiple call centers may be located in localities around the globe where costs are lowest for such. In both cases, through remoteness and high information volume there is a certain anonymity in privacy created simply by volume. Careful hiring practices, bonding, and other basic business practices can add to security.

FIG. 1 is a topology diagram of a system according to a preferred embodiment of the present invention. In this example a subscriber places a call from an airphone 136 via satellite equipment and communication links 110, 111, 112 and 113 through a conventional phone network 101 which connects via connection 115 into a Transcription Server 130 according to an embodiment of the present invention. The subscriber dictates the material to be transcribed after performing whatever ID and security procedures are operable, in voicemail electronic form in server 130.

Once the subscriber finishes security and ID procedures (which may be done through DTMF tones relating to stored information for comparison), dictates the information, then appends instructions, the information package is routed to a message waiting line. The system of the Transcription Server alerts a next available transcribing technician via a call to the technician's pager 135 through link 115 and paging connection 114 via the telephone system. The technician alerted can then call in a short period of time from his or her workstation 134 via a connection 118 and Internet or Wide-Area Network and pick up the information to be transcribed, along with forwarding instructions. If there is no response, or if the person paged declines the task, the next person in line will be paged and so forth until the task is accepted.

The person that accepts the task then completes the transcription according to the verbal instructions and/or DTMF instruction left along with a file, and then processes it (forwarding) accordingly. There are many routing possibilities. In this example one copy is sent as e-mail to a pocket organizer 133 carried by the subscriber, over the service provider to which the subscriber also subscribes (ISP2), by way of Transcribe ISP 102, link 119 to the Internet, and link 120 to the subscriber's ISP2.

At the same time, or instead, the subscriber has instructed a fax copy be sent to his/her hotel on fax machine 131 by connection 116, via the phone network and connection 115 which links to a CTI interface in server 130. At this point in the preferred embodiment billing is initiated and the exemplary transaction is closed.

It will be clear to those with skill in the art that telephone 136 may also be connected directly to a phone system. In addition, the technician may be on a completely different network all the way around the world. There are many other alterations that might be made in the topology described without departing from the spirit and scope of the invention.

FIG. 2 is a pseudo-code listing for operational software for the system of FIG. 1. In lines 200 to 205 the main programs are listed, being named GetDoc, FindTec, MailDoc, and BillCust. These code modules operate in parallel.

Process GetDoc is listed from line 207 through line 216, and monitors input from subscribers, accepts incoming calls over the telephony network and link 115 of FIG. 1 into the computer telephony interface CTI, and informs each subscriber to enter ID number and pin numbers. In some embodiments there are facilities and code for allowing callers that are not registered subscribers to instantaneously establish an account by entering a credit card number, and a name and address can be spoken onto a recording.

After these opening amenities, the subscriber has an option to choose preprogrammed destinations. Lines 212 though to 215 provide for the subscriber to do several dictations. DTMF entries from a telephone keyboard are recognized by the dictation system for preprogrammed functions like: rewind, fast forward, queue, etc., faster and slower speed, and to allow real-time editing like may be done on a conventional dictation machine.

Every time a document is finished, the subscriber is prompted for new direction, such as to do another dictation, continue, or finish the call. Each document is added into a DocList that is a list of pending documents for processing.

Process FindTec begins at line 218 and ends on line 226. FindTec monitors DocList. If DocList is not empty, FindTec tries to find and page the next available technician as shown in FIG. 1 represented by pager 135, for example. If the technician does not respond within a set period of time, for example 5 minutes, FindTec moves on to and pages the next technician in its que. If the technician does respond the voicemail file is then electronically mailed to that technician including the relevant part of the instructions the user may have entered in the GetDoc procedure for destination and so forth. Then the technician transcribes the document and puts it in the form as instructed by the subscriber. The technician also may transcribe an e-mail address, a street address, or fax numbers that the subscriber may have entered by voice rather than through keystrokes. When the technician has finished the job he or she e-mails the document back to the transcribe server where it is added to the list of transcribed documents.

Procedure MailDoc picks up at this point, and is listed from line 228 through line 232. MailDoc picks up documents that have arrived from technicians and checks attached forwarding information. MailDoc takes care of forwarding copies of the transcribed documents to fax numbers and e-mail addresses according to corresponding instructions. There may be multiple fax numbers and e-mail addresses to which copies are sent. There may also be preprogrammed lists of numbers and addresses for copies. There is also an option for delivery to places on the planet where fax and e-mail may be unavailable. In such cases mail, UPS, and /or FedEx may be used.

At this point a job ID is removed from pending mail and the transcribed document list, and is moved to procedure BillCust, which is listed on lines 235 through 241. BillCust checks for billable job IDs, accesses subscriber profiles, look up what billing method has been agreed to with a particular subscriber, and calculates billing based on job size. The formula for billing takes into account things like minutes spoken, words or character style, pages typed, the priority level a customer may have requested, and mailing methods instructed and used. This cost is billed to the subscriber with the a correct job ID with a time stamp and date stamp for receipt and completion. In some embodiments accounting of technicians time and involvement and compensation is also handled by the accounting module called BillCust. In others a separate module is used for accounting for technicians.

After billing, the job is removed from BillDoc and put into a long term archive which can be stored for several years for record purposes.

It will be apparent to those with skill in the art that there are many alterations that may be made in the embodiments described without departing from the spirit and scope of the invention. In particular there are many ways communication between the subscriber, the transcribe server, technicians, and receiving and forwarding stations may be accomplished within the scope of the invention. Further a transcription system according to the invention may comprise a network of several or many transcription servers adapted as described in various embodiments. There are similarly many ways the various software routines involved may be programmed, as it is well-known that there are many individual preferences in writing code among professional programmers. There are similarly many other alterations that might be made without departing from the spirit and scope of the invention. The invention is limited only by the claims which follow.

What is claimed is:

1. A transcription system comprising:

a transcribe server for receiving and processing information to be transcribed; and communication apparatus connected to the transcribe server for electronic communication with external stations, the communication apparatus including one or more of apparatus adapted for analog voice transmission, Internet access and communication, facsimile communication, and pager communication;

wherein, over the communication apparatus, the transcribe server receives from a subscriber substantially voice-based information to be transcribed, selects and alerts a transcribe technician from preprogrammed information, sends the substantially voice-based information to the transcribe technician, receives a transcribed version of the substantially voice-based information from the transcribe technician, informs the subscriber of progress, forwards copies of the transcribed version to selected forwarding stations, and calculates and transmits billing to the subscriber.

2. A transcription system as in claim 1 wherein multiple transcription servers are incorporated and networked.

3. The system of claim 1 wherein the information to be transcribed is accompanied by specific instructions for one or both of processing and forwarding.

4. The system of claim 1 wherein the transcribe server is preprogrammed with data pertinent to particular subscribers, including processing and forwarding recipes, which the transcribe server follows unless otherwise directed.

5. The system of claim 1 wherein forwarding comprises one or more of e-mail, facsimile transmission, surface mail, and package services.

6. A transcribe server comprising:

a recording and listing module adapted for receiving from subscribers and recording voice-based messages including instructions for processing and forwarding copies of transcribed versions;

an alert module adapted for enlisting transcribe technicians, forwarding the voice-based messages including processing instructions to the transcribe technicians, and for receiving and storing transcribed versions of the voice-based messages returned by the transcribe technicians;

a forwarding module adapted for forwarding the transcribed versions to preselected destinations; and an accounting module adapted for calculating billing and forwarding billing information to the subscribers.

7. The transcribe server of claim 6 wherein specific processing and forwarding instructions are preprogrammed for specific subscribers.

8. The transcribe server of claim 6 wherein transcribe technicians are alerted by paging links.

9. The transcribe server of claim 6 wherein forwarding is done by one or more of e-mail, facsimile service, surface mail, and commercial package services.

10. The transcribe server of claim 6 wherein an accounting algorithm used by the accounting module accounts for one or more of minutes spoken, words or character style, pages typed, priority level a subscriber may have requested, and mailing methods instructed and used.

* * * * *